Oct. 4, 1955 R. S. JOHNSON 2,719,922
CORE TUNED LOOP
Filed Dec. 15, 1950
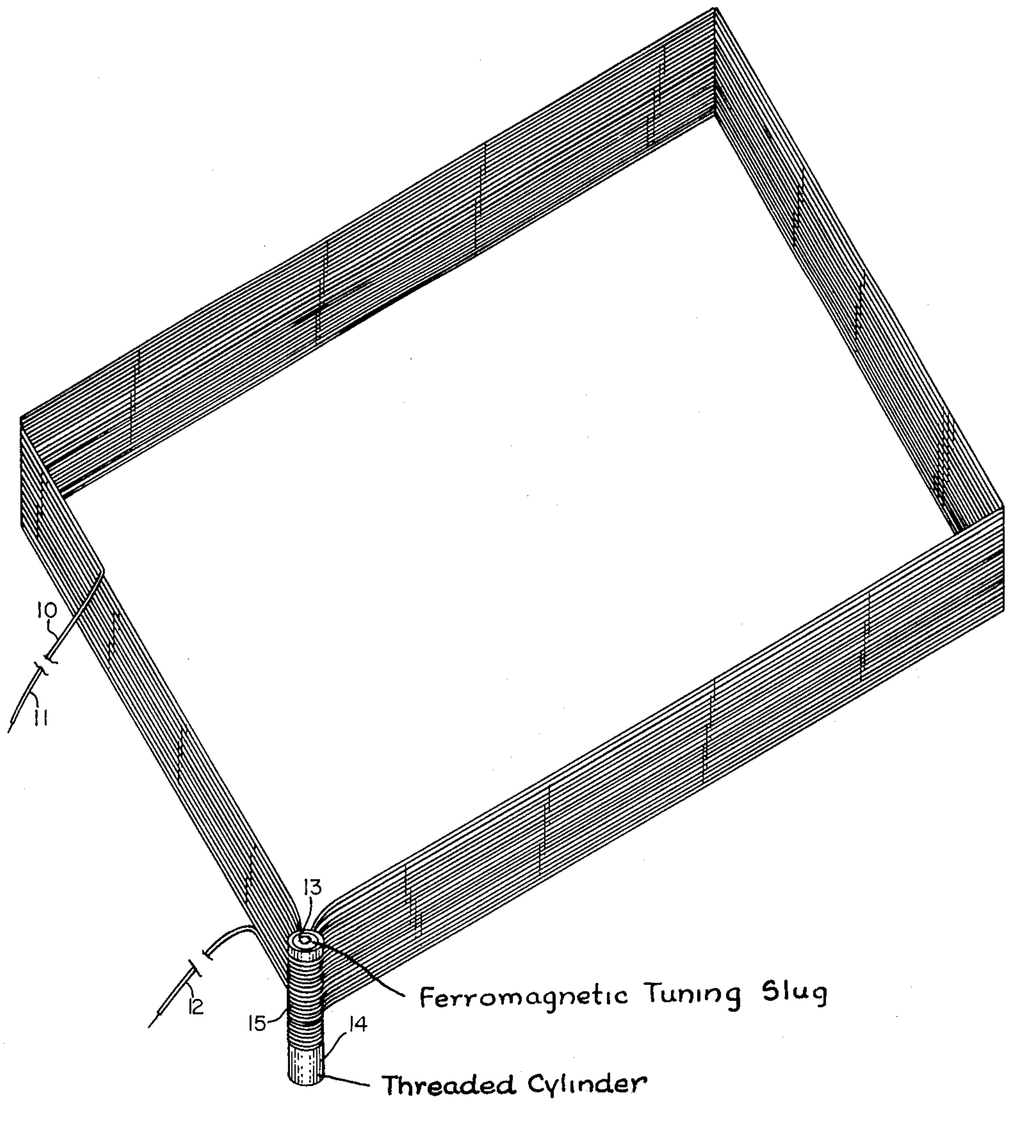
INVENTOR.
ROLAND S. JOHNSON
BY Francis W. Crotty
HIS ATTORNEY 2,719,922
Patented Oct. 4, 1955

2,719,922

CORE TUNED LOOP

Roland S. Johnson, Chicago, Ill., assignor to Zenith Radio Corporation, a corporation of Illinois Application December 15, 1950, Serial No. 200,969

1 Claim. (Cl. 250—33.67)

This invention relates to radio antennas and more particularly to loop antennas for use with radio receivers or the like.

The advantages afforded by the use of a loop antenna for intercepting electromagnetic radio waves and impressing the intercepted waves on the input terminals of a superheterodyne receiver are well known in the radio art. Customarily the loop antenna is built into the chassis or cabinet of the receiver. For optimum reception across the entire portion of the frequency spectrum for which the receiver is designed, a variable tuning condenser is connected across the loop antenna terminals, and the antenna tuning condenser is arranged for unicontrol operation with the tuning condenser in the local oscillator circuit. The tuning condensers for the antenna and local oscillator circuits are constituted by a pair of air condensers having their rotors mounted on a common shaft, and trimmer condensers are connected in shunt with one or both of the tuning condensers to permit alignment of the antenna and local oscillator circuits in such a manner as to insure that the intermediate frequency is maintained constant across the entire signal band.

Proper tracking between the antenna and local oscillator circuits with such an arrangement may be obtained only when the self-inductance of the loop antenna falls within certain limits determined by the capacity ranges of the tuning and trimmer condensers. Since these capacity ranges may vary within the limits of manufacturing tolerances, and since the self-inductance of the loop antenna may also vary within manufacturing tolerances, it has been common practice to "knife" the gang tuning condenser by bending the rotor plates or alternatively to adjust the loop inductance after installation in the chassis or cabinet by removing one or more fractional parts of a turn from the loop, until the desired alignment is obtained. Such a procedure is obviously time consuming and adds materially to the cost of the receiver.

It is an important object of the present invention to provide a new and improved loop antenna for use in a radio receiver.

It is another object of the invention to provide a loop antenna for a superheterodyne receiver in which the self-inductance may be conveniently adjusted in order to facilitate tracking between the antenna and local oscillator circuits.

In accordance with the invention, a new and improved radio antenna comprises an insulated conductor convoluted in the form of a loop with adjacent convolutions disposed in substantially parallel planes. A peripheral portion of the loop is distorted to define a generally cylindrical core-receiving recess, with corresponding portions of each of the convolutions being deformed to encompass a major portion of the cross sectional area defined by the recess. A hollow cylinder is supported by the convolutions in a position within the recess, and a ferromagnetic core is supported in an adjustably fixed position within the cylinder for adjusting the inductance of corresponding incremental portions of the adjacent convolutions.

The features of the present invention which are believed to be novel are set forth with particularity in the appended claim. The invention, together with further objects and advantages thereof, may best be understood, however, by reference to the following description taken in connection with the accompanying drawing, in which the single figure is a perspective view of a loop antenna constructed in accordance with the present invention.

As shown in the figure, a loop antenna constructed in accordance with the invention comprises a conductor 10 convoluted in the form of a loop and provided with a pair of terminals 11 and 12 for connection to the input terminals of a superheterodyne receiver (not shown). The loop is wound in the form of a solenoid with adjacent convolutions disposed in substantially parallel planes in a manner which, per se, is well known in the art. A threaded ferromagnetic tuning slug 13, which may conveniently consist of a comminuted or powdered iron core, is adjustably fixed within an internally threaded cylinder 14 cemented to or otherwise supported by a formed peripheral portion 15 of the loop. In this manner, ferromagnetic core 13 is asymmetrically positioned within the loop.

The cross-sectional area of ferromagnetic core 13 is made small relative to the area enclosed by the loop, so that movement of core 13 in a direction parallel to the axis of the loop (perpendicular to the convolution-planes) affects primarily the inductance of corresponding incremental portions of the adjacent convolutions constituting the loop. Thus, the inductance measured between terminals 11 and 12 may be accurately controlled within a limited range by adjusting the position of core 13 in coil form 14.

Merely by way of illustration and in no sense by way of limitation, a 6½" by 8½" rectangular loop may comprise 19 convolutions or turns of self-supporting #28 double-Celanese covered wire, and a tuning slug 13 of about ¼" diameter may be employed. Such a loop has been found to possess a mean self-inductance of about 190 microhenries, and this value may be increased or decreased by as much as ½% by adjustment of tuning slug 13, a range which has been found ample to permit the desired tracking between the antenna and local oscillator circuits. While the provision of a trimmer slug in accordance with the invention is of particular advantage in connection with an antenna for a superheterodyne receiver, it may also be employed to advantage in loop antennas for other types of radio receivers, as for example a tuned-radio-frequency (TRF) receiver.

While a particular embodiment of the present invention has been shown and described, it is apparent that various changes and modifications may be made, and it is therefore contemplated in the appended claim to cover all such changes and modifications as fall within the true spirit and scope of the invention.

I claim:

A radio antenna comprising: an insulated conductor convoluted in the form of a loop with adjacent convolutions disposed in substantially parallel planes, a peripheral portion of said loop being distorted to define a generally cylindrical core receiving recess, with corresponding portions of each of said convolutions being deformed to encompass a major portion of the cross-sectional area defined by said recess; a hollow cylinder supported by said convolutions in a position within said recess; and a ferromagnetic core, having a cross-sectional area small relative to the area enclosed by said loop, supported in adjustably fixed position within said cylinder for adjusting the inductance of corresponding incremental portions of said adjacent convolutions.

References Cited in the file of this patent

UNITED STATES PATENTS

| | | |
|---|---|---|
| 1,679,095 | Pickard | July 31, 1928 |
| 2,284,719 | Bergtold | June 2, 1942 |
| 2,339,234 | Polydoroff | Jan. 11, 1944 |
| 2,460,492 | Cutler et al. | Feb. 1, 1949 |
| 2,469,168 | Loughlin | May 3, 1949 |

FOREIGN PATENTS

| | | |
|---|---|---|
| 628,024 | Great Britain | Aug. 19, 1949 |